US012662865B2

(12) United States Patent
Yu et al.

(10) Patent No.: US 12,662,865 B2
(45) Date of Patent: Jun. 23, 2026

(54) OPENING AND CLOSING COVER ASSEMBLY FOR OPENING PORTION OF AUTOMOBILE BODY

(71) Applicants: Golde Shanghai Co.,Ltd, Shanghai (CN); CIE Golde Shanghai Innovation Co.,Ltd, Shanghai (CN)

(72) Inventors: Weilong Yu, Shanghai (CN); Jian Zhang, Shanghai (CN); Pengtai Zhao, Shanghai (CN); Chenguang Niu, Shanghai (CN)

(73) Assignees: Golde Shanghai Co., Ltd, Shanghai (CN); GIE Golde Shanghai Innovation Co., Ltd, Shanghai (CN)

( * ) Notice: Subject to any disclaimer, the term of this patent is extended or adjusted under 35 U.S.C. 154(b) by 22 days.

(21) Appl. No.: 18/837,895

(22) PCT Filed: Jan. 9, 2023

(86) PCT No.: PCT/CN2023/071355

§ 371 (c)(1),
(2) Date: Aug. 13, 2024

(87) PCT Pub. No.: WO2023/151441

PCT Pub. Date: Aug. 17, 2023

(65) Prior Publication Data

US 2025/0146349 A1 May 8, 2025

(30) Foreign Application Priority Data

Feb. 14, 2022 (CN) ......................... 202210132193.0
Feb. 14, 2022 (CN) ......................... 202220289961.9

(51) Int. Cl.
*E05F 15/665* (2015.01)
*E05D 15/16* (2006.01)

(52) U.S. Cl.
CPC .......... *E05F 15/665* (2015.01); *E05D 15/165* (2013.01); *E05Y 2201/722* (2013.01); *E05Y 2900/53* (2013.01)

(58) Field of Classification Search
CPC ..... E05F 15/665; E05F 15/165; E05F 15/635; E05Y 2201/722; E05Y 2900/53
See application file for complete search history.

(56) References Cited

U.S. PATENT DOCUMENTS

2004/0256881 A1* 12/2004 Takeda .................... E05F 15/63 296/146.2
2021/0172235 A1* 6/2021 Choi ..................... E05F 15/655

FOREIGN PATENT DOCUMENTS

CN 111907607 A 11/2020
CN 212354180 U 1/2021
(Continued)

*Primary Examiner* — Sisay Yacob
(74) *Attorney, Agent, or Firm* — IPRTOP LLC

(57) ABSTRACT

An opening and closing cover assembly for an opening portion on an automobile body is provided. It comprises a cover plate configured for opening and closing the opening portion, a driving source, a guide member driven by the driving source to perform a reciprocating motion, a transmission sliding block, and a fixed guide rail fixed to the automobile body. The guide member and the transmission sliding block are fixed to each other, the transmission sliding block is connected to the cover plate, and a first sliding groove fitted with the guide member and a second sliding groove slidably fitted with the transmission sliding block are formed within the fixed guide rail. Through the guide member and the transmission sliding block, the driving source drives the cover plate to reciprocate between a closed position and a fully open position, allowing the opening portion to be automatically opened and closed.

10 Claims, 11 Drawing Sheets

(56) References Cited

FOREIGN PATENT DOCUMENTS

| | | | |
|---|---|---|---|
| CN | 112477996 | A | 3/2021 |
| CN | 113246756 | A | 8/2021 |
| CN | 217028548 | U | 7/2022 |
| DE | 102017212396 | A1 | 1/2019 |

* cited by examiner

OPENING AND CLOSING COVER ASSEMBLY FOR OPENING PORTION OF AUTOMOBILE BODY

FIELD OF THE INVENTION

The present disclosure relates to the field of automobiles, and in particular, to an opening and closing cover assembly for an opening portion of automobile body.

BACKGROUND OF THE INVENTION

Currently, automobiles with autonomous or assisted driving functions are equipped with various types of radars or cameras to gather information about their surroundings. These data are processed by the onboard computer to determine the automobile's driving path. Most of these radars or cameras are quite small, like reversing radars, and can be directly placed on the automobile's surface, hidden in the front windshield, air intake grille, or front and rear bumpers. However, a downside of these small devices is their low power, which limits their ability to perform wide-range, long-distance, and high-precision environmental scanning. This limitation means they can't meet the data collection needs for fully autonomous driving. To achieve the necessary data collection for full autonomy, it's essential to increase the power and coverage range of the radars or cameras, which inevitably makes them larger. As a result, integrating these larger radars or cameras seamlessly into the automobile's exterior becomes challenging.

To tackle this issue, large radar or camera units can be integrated within the automobile body and concealed with a cover for a sleek appearance. When needed, the cover retracts, revealing the radar port, and the radar or camera extends out to scan the surroundings, enabling autonomous or assisted driving functions. When not in use, the radar or camera retracts back into the automobile, and the cover seals the port. This design helps maintain low energy consumption while driving and protects the radar or camera from environmental factors and unauthorized access, such as dust, rain, and unintended pressure. However, current automobiles have covers that need to be manually opened or closed, like fuel tank or charging port covers, which open outward and detract from user experience and aesthetics.

SUMMARY OF THE INVENTION

In view of the above-mentioned shortcomings, the present disclosure provides an opening and closing cover assembly, which can open and close automatically and maintains an attractive appearance in both open and closed positions.

The opening and closing cover assembly is mounted at an opening portion on an automobile body. The opening and closing cover assembly comprises a cover plate, a driving source, a guide member, a transmission sliding block, and a fixed guide rail. The cover plate is configured for opening and closing the opening portion, the guide member is driven by the driving source to perform a reciprocating motion, and the fixed guide rail is fixed to the automobile body. The guide member and the transmission sliding block are fixed to each other, the transmission sliding block is connected to the cover plate, and a first sliding groove and a second sliding groove are formed within the fixed guide rail. The first sliding groove is slidably fitted with the guide member, and the second sliding groove is slidably fitted with the transmission sliding block. Through the guide member and the transmission sliding block, the driving source is configured to drive the cover plate to reciprocate between a closed position and a fully open position.

When the cover plate is in the closed position, the cover plate covers the opening portion.

When the cover plate is in the fully open position, the cover plate is inside the automobile body, and the opening portion communicates the inside and the outside of the automobile body.

Further, an active pin and a passive pin are disposed on an outer peripheral side of the cover plate, a third sliding groove slidably fitted with the active pin and a fourth sliding groove slidably fitted with the passive pin are formed within the fixed guide rail, and a transmission sliding groove slidably fitted with the active pin is formed within the transmission sliding block.

The third sliding groove and the fourth sliding groove are closer to the cover plate than the first sliding groove and the second sliding groove, and the transmission sliding block is disposed between the second sliding groove and the third sliding groove.

Further, the active pin is further rotatably fitted with the third sliding groove and the transmission sliding groove, and the passive pin is further rotatably fitted with the fourth sliding groove. The transmission sliding groove comprises a first groove segment and a second groove segment connected to the first groove segment, and an obtuse included angle is formed between the first groove segment and the second groove segment. The third sliding groove comprises a third groove segment and a fourth groove segment connected to the third groove segment, and an obtuse included angle is formed between the third groove segment and the fourth groove segment.

When the cover plate is in the closed position, the active pin is in the first groove segment and the third groove segment, and the passive pin is located at a first end of the fourth sliding groove.

When the transmission sliding block moves along the second sliding groove and the active pin moves in the transmission sliding groove, the active pin moves and rotates in the third groove segment, and the passive pin rotates in the fourth sliding groove, such that the cover plate rotates with the passive pin as a fulcrum.

When the cover plate is in the fully open position, the active pin is in the second groove segment and the fourth groove segment, and the passive pin is located at a second end of the fourth sliding groove.

Further, the fixed guide rail comprises an inner guide rail disposed on an outer side of the cover plate and an outer guide rail disposed on an outer side of the inner guide rail. The first sliding groove and the second sliding groove are formed within the outer guide rail, the third sliding groove and the fourth sliding groove are formed within the inner guide rail, and the guide member and the transmission sliding block are movably disposed between the inner guide rail and the outer guide rail.

Further, two guide posts protrude outward from an end face of the transmission sliding block and are movably disposed in the second sliding slot.

Further, the transmission sliding block is provided with a limiting part, the fixed guide rail is provided with a limiting bump, and the limiting bump is located on a movement path of the transmission sliding block. When the cover plate is in the closed position, the limiting part on the transmission sliding block abuts the limiting bump on the fixed guide rail.

Further, the guide member, the transmission sliding block, and the fixed guide rail constitute an intermediate transmission unit. The opening and closing cover assembly comprises two intermediate transmission units, and a line connecting the two intermediate transmission units is perpendicular to a line connecting the closed position and the fully open position of the cover plate.

Further, the opening and closing cover assembly further comprises a gear. The driving source is a motor, the guide member is a guide gear rack, the driving source is connected to the gear for driving the gear to rotate, and an end of the guide member away from the transmission sliding block is engaged with the gear.

Further, the guide member comprises a first straight segment, a second straight segment, and a bent connecting segment. The first straight segment extends straightly along a direction parallel to a line connecting the closed and fully open positions of the cover plate, the second straight segment is engaged with the gear, and the bent connecting segment is connected between the first straight segment and the second straight segment. An end of the first straight segment is fixed to the transmission sliding block, and the first straight segment is located in the first sliding groove.

Further, the opening and closing cover assembly further comprises a fixed guide member fixed to the automobile body. A first guide groove extending in an extending direction of the bent connecting segment and a second guide groove extending in an extending direction of the second straight segment are formed in the fixed guide member. The first sliding groove is communicated with the first guide groove, and the first guide groove is communicated with the second guide groove. The bent connecting segment is slidably fitted with the first guide groove, and the second straight segment is slidably fitted with the second guide groove.

Further, the cover plate comprises a cover carrier and an outer cover matching the automobile body. The outer cover is fixed on an outer surface of the cover carrier, and the transmission sliding block is connected to the cover carrier. When the cover plate is in the closed position, the outer cover is located at the opening portion.

As described above, the opening and closing cover assembly of the present disclosure has following advantages.

Through the guide member and the transmission sliding block, the driving source is configured to drive the cover plate to reciprocate between the closed position and the fully open position, allowing the opening portion to be automatically opened and closed, eliminating the need for manual operation and enhancing the user experience. Additionally, as the cover plate opens, it retracts into the automobile body, and when in the fully open position, the cover plate is completely stored inside the automobile body, leaving no part protruding from the opening portion, while allowing the opening portion to be fully exposed, enhancing the automobile's overall aesthetics. When in the closed position, the cover plate covers the opening portion, effectively sealing it and giving the automobile a streamlined appearance, further enhancing its overall aesthetics.

REFERENCE NUMERALS

Figure 1:
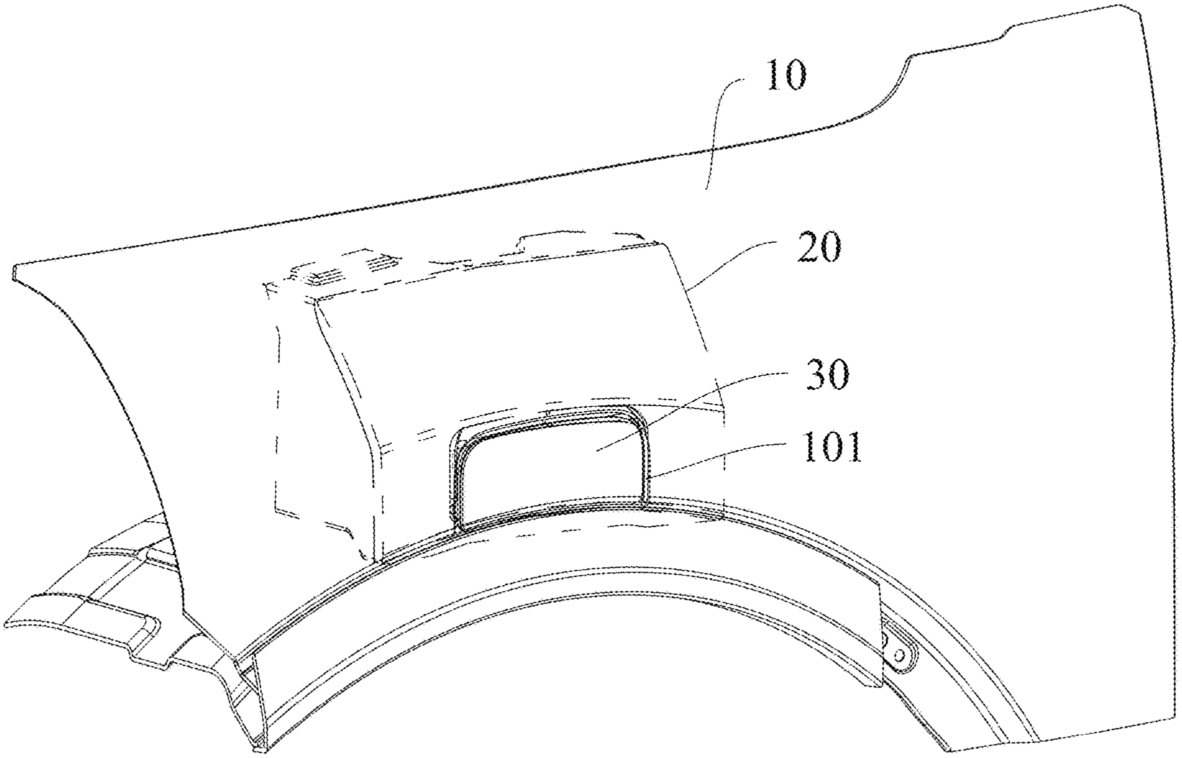
FIG. 1 shows a schematic diagram of a radar assembly mounted on an automobile body, configured with an opening and closing cover assembly according to the present disclosure.

10 Automobile body
101 Opening portion
20 Fixed housing
21 Through hole part
30 Cover plate
31 Cover carrier
32 Outer cover
33 Sealing edge
34 Active pin
35 Passive pin
40 Sealing ring
50 Driving source
60 Gear
70 Guide member
71 First straight segment
72 Second straight segment
73 Bent connecting segment
74 Plug-in block
80 Transmission sliding block
81 Transmission sliding groove
811 First groove segment
812 Second groove segment

82 Guide post
83 Limiting part
84 Clamping groove
90 Fixed guide rail
91 Inner guide rail
911 Third sliding groove
912 Fourth sliding groove
913 Third groove segment
914 Fourth groove segment
915 Limiting bump
92 Outer guide rail
921 First sliding groove
922 Second sliding groove
110 Fixed guide member
111 First guide groove
112 Second guide groove
113 Body of the fixed guide member
114 Cover of the fixed guide member
115 Mounting hole
120 Radar body

DETAILED DESCRIPTION OF THE INVENTION

The embodiments of the present disclosure will be described below. Those skilled can easily understand disclosure advantages and effects of the present disclosure according to contents disclosed by the specification.

It should be noted that the structure, ratio, size, etc. shown in the accompanying drawings in this specification are only used to illustrate the content disclosed in the specification for the understanding and reading of those familiar with this technology, and are not intended to restrict the implementation of the present invention. Any structural modification, proportional relationship change or size adjustment should still fall within the scope of the present disclosure, given that no effect and objective achievable by the present disclosure are hindered. In the meantime, the terms “upper”, “lower”, “left”, “right”, “intermediate” and “one” as used in this specification are also for convenience of description, and are not intended to restrict the scope of the present disclosure, and the change or adjustment of the relative relationship is considered to be within the scope of the present disclosure without substantial changes in technology.

Figure 4:
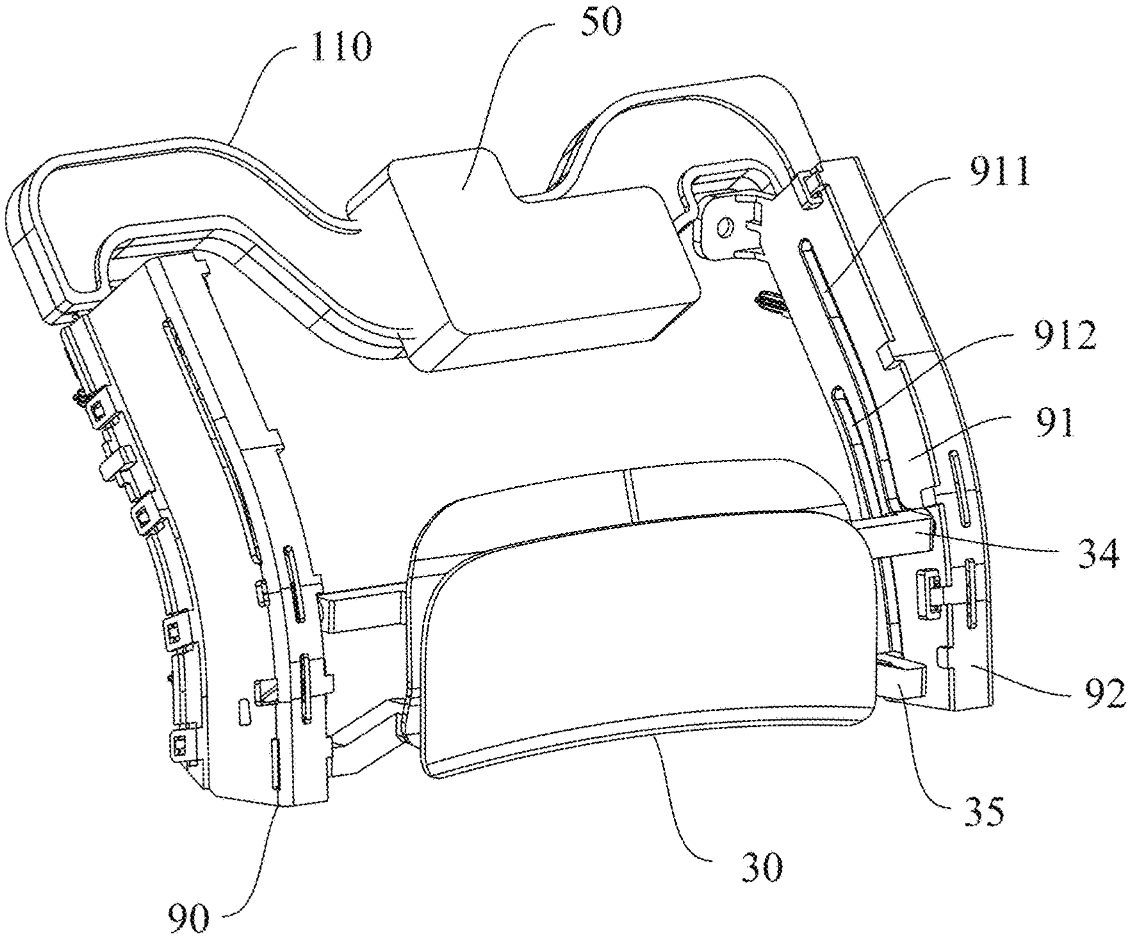
FIG. 4 shows a schematic diagram illustrating connections among a driving source, a gear, a guide member, a transmission sliding block, and a cover plate according to the present disclosure.

The present disclosure provides an opening and closing cover assembly. As shown in FIG. 4, the opening and closing cover assembly is mounted at an opening portion 101 on an automobile body 10. FIG. 1 shows a schematic diagram of the automobile body 10 after the opening and closing cover assembly has been mounted thereon. The opening and closing cover assembly can be mounted at various functional opening portions 101 on the automobile body 10, such as a fuel tank opening (i.e., the opening portion 101 is the fuel tank opening), a radar opening for a concealed built-in radar (i.e., the opening portion 101 is the radar opening), or a charging opening (i.e., the opening portion 101 is the charging opening). In the present disclosure, the opening portion 101 shown in FIG. 1 is assumed to be a radar opening for explanatory purposes. Based on this, the present disclosure further provides a radar assembly for automobiles, which comprises the opening and closing cover assembly described herein.

Figure 12:
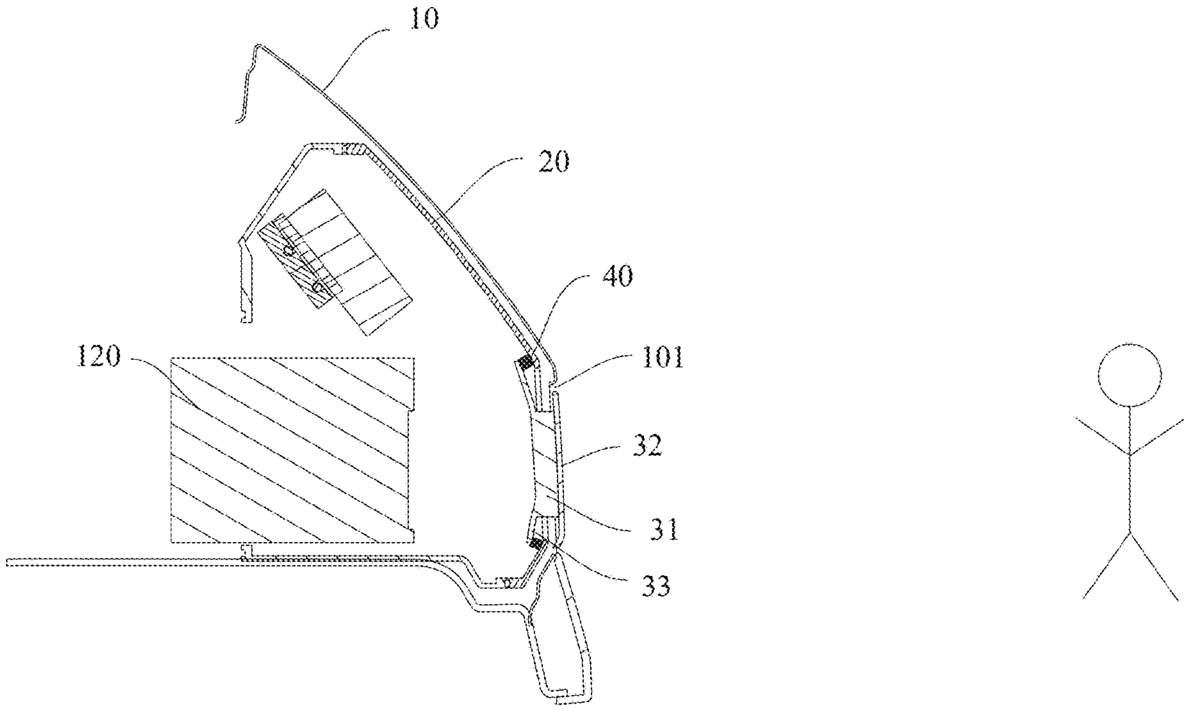
FIG. 12 shows a schematic diagram of the radar assembly when the cover plate is in a closed position.
Figure 15:
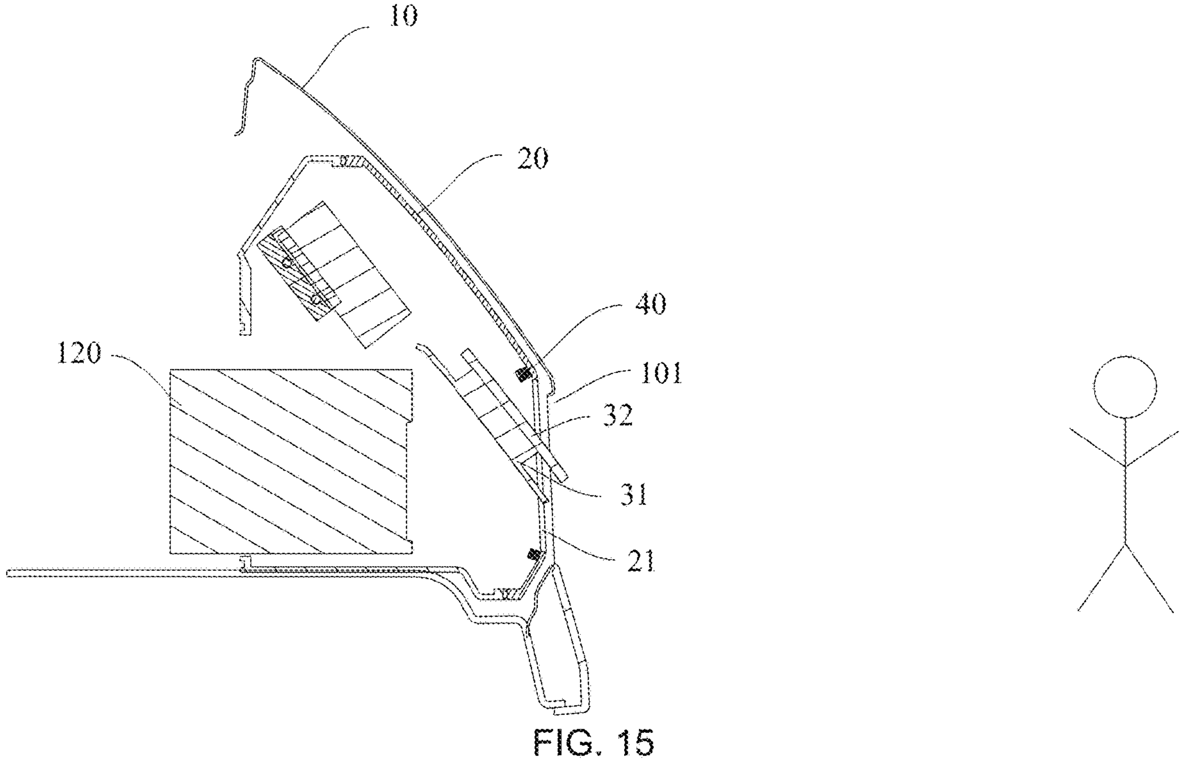
FIG. 15 shows a schematic diagram of the radar assembly when the cover plate retracts into the automobile body.

As shown in FIGS. 1-4, the opening and closing cover assembly comprises a cover plate 30, a driving source 50, a guide member 70, a transmission sliding block 80, and a fixed guide rail 90. The cover plate 30 is configured for opening and closing the opening portion 101, the guide member 70 is driven by the driving source 50 to perform reciprocating motions, and the fixed guide rail 90 is fixed to the automobile body 10. The guide member 70 and the transmission sliding block 80 are fixed to each other, the transmission sliding block 80 is connected to the cover plate 30, and a first sliding groove 921 and a second sliding groove 922 are formed within the fixed guide rail 90. The first sliding groove 921 is slidably fitted with the guide member 70, and the second sliding groove 922 is slidably fitted with the transmission sliding block 80. Through the guide member 70 and the transmission sliding block 80, the driving source 50 is configured to drive the cover plate 30 to reciprocate between a closed position and a fully open position, that is, allowing the cover plate 30 to move towards or away from the opening portion 101. The fixed guide rail 90 guides the guide member 70 and the transmission sliding block 80 for motion. Furthermore, as shown in FIG. 12, when the cover plate 30 is in the closed position, the outer cover 30 is located at the opening portion 101 to cover the opening portion 101, thereby the opening portion 101 closes. As shown in FIG. 15, when the cover plate 30 is in the fully open position, the outer cover 30 is inside the automobile body 10 and is away from the opening portion 101, and the opening portion 101 communicates the inside with the outside of the automobile body 10, thereby opening the opening portion 101. Specifically, the opening and closing cover assembly of the present disclosure features an integrated structure. By installing the fixed guide rail 90 on the automobile body 10 in a removable manner, the entire opening and closing cover assembly can be mounted on or detached from the automobile body 10.

Figure 2:
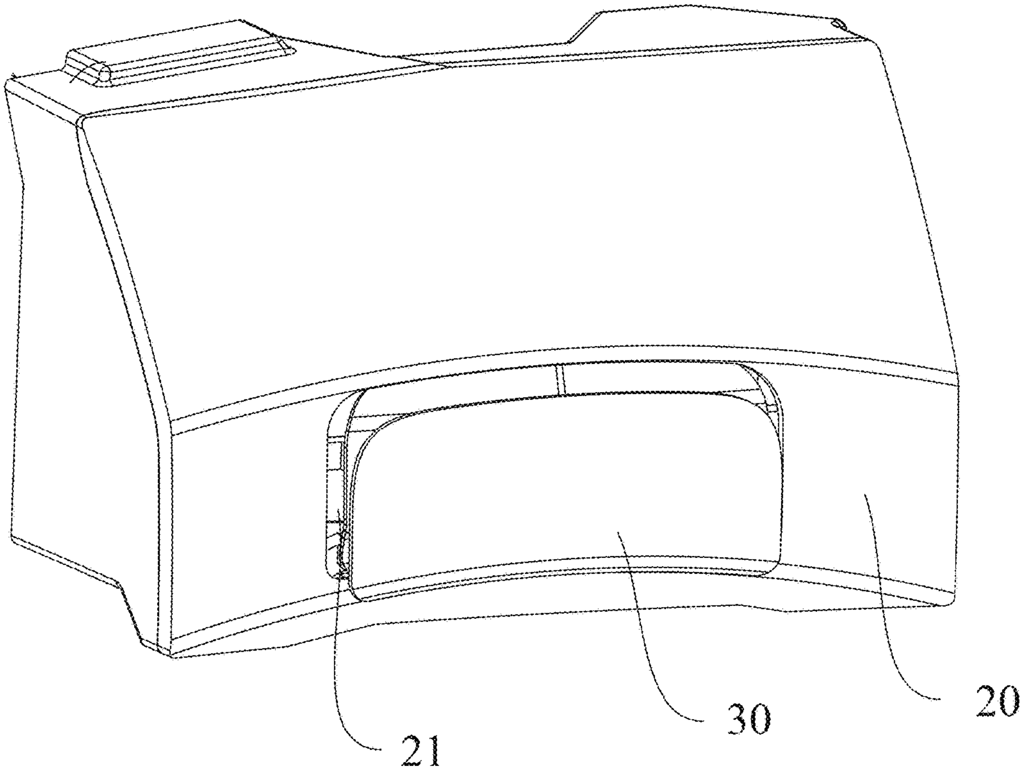
FIG. 2 shows a schematic diagram of the radar assembly according to the present disclosure.
Figure 3:
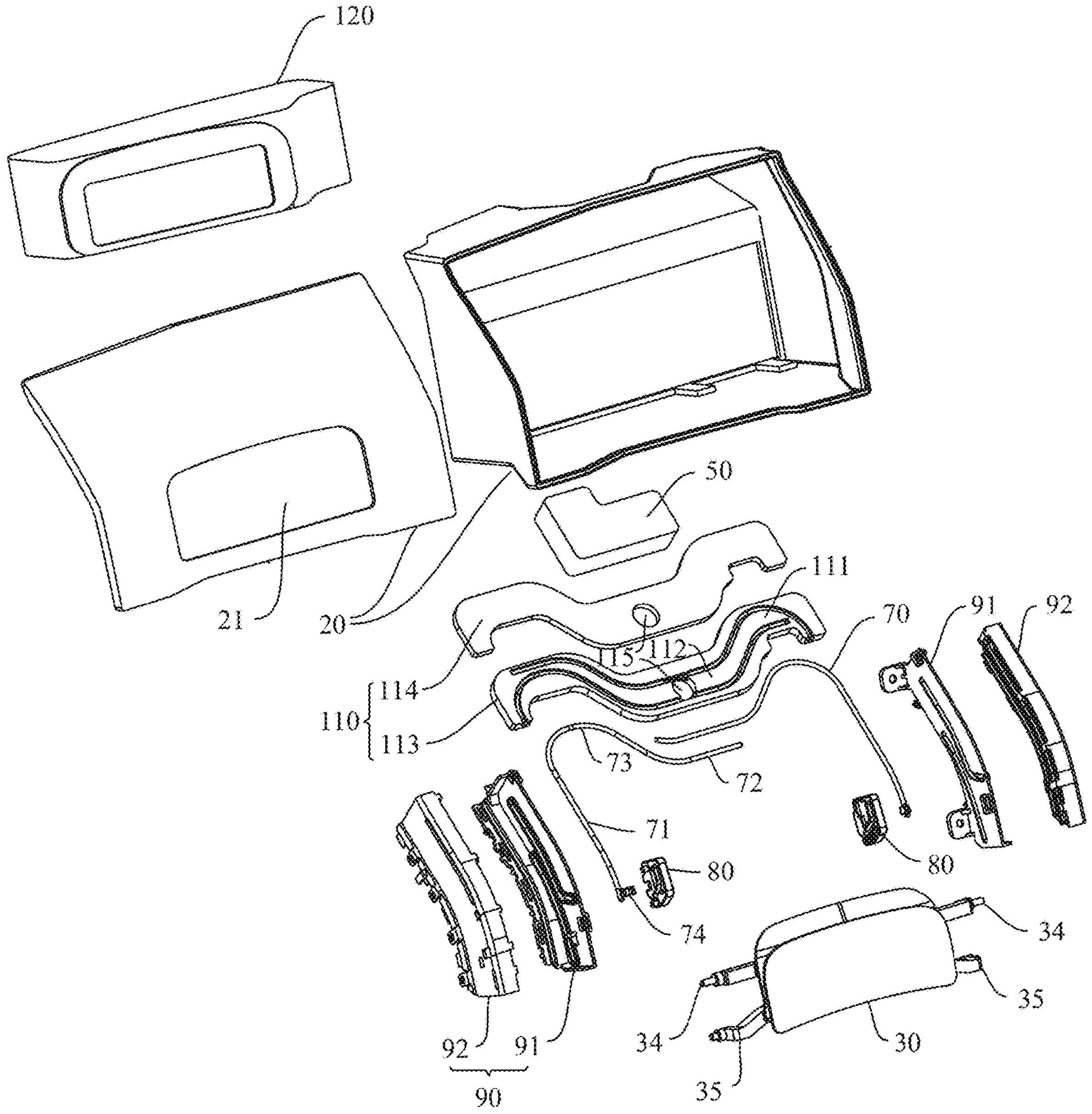
FIG. 3 shows an exploded view of the radar assembly in FIG. 2.

As shown in FIGS. 1-3, the radar assembly of the present disclosure further comprises a radar body 120, a fixed housing 20, and an extending mechanism. The fixed housing 20 is fixed in the automobile body 10, and the extending mechanism is mounted on the fixed housing 20. The fixed housing 20 is provided with a through hole part 21 that aligns with the opening portion 101 (in other words, the opening portion can be seen as an outer opening of the through hole part), and the radar body 120 is movably mounted in the fixed housing 20. When the radar body 120 is in its retracted position, it is away from the opening portion 101. Conversely, when the radar body 120 is in its extended position, it is situated at the opening portion 101. The extending mechanism drives the radar body 120 to reciprocate between its retracted and extended positions, that is, the extending mechanism drives the radar body 120 to move towards or away from the opening portion 101. The fixed guide rail 90 can be directly fixed in the fixed housing 20. Specifically, the radar assembly of the present disclosure features an integrated structure. By installing the fixed housing 20 on the automobile body 10, the entire radar assembly can be mounted on or detached from the automobile body 10.

Figure 21:
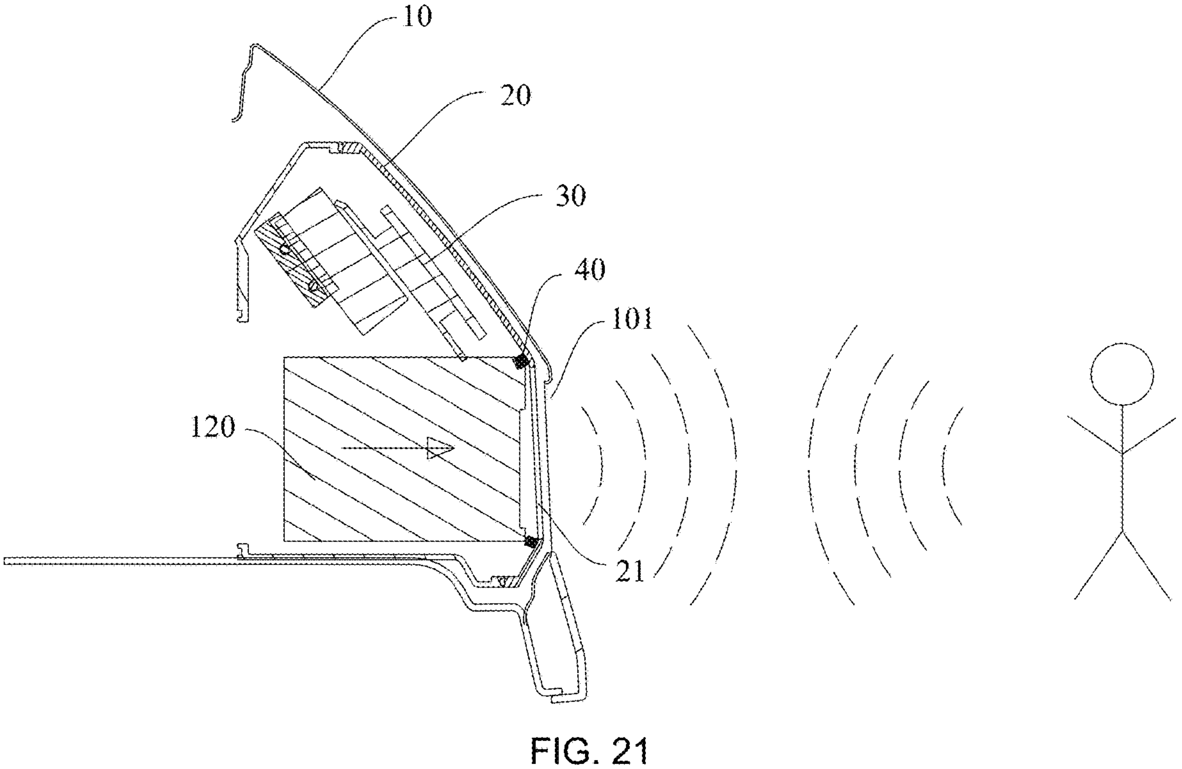
FIG. 21 shows a schematic diagram of the radar assembly when a radar body is in an extended position according to the present disclosure.

When an automobile’s autonomous or assisted driving functions are not in use, as shown in FIG. 12, the radar body 120 is in its retracted position, accommodated within the fixed housing 20, and thus within the automobile body 10, achieving a built-in and hidden configuration for the radar body 120. The cover plate 30, in its closed position, covers and closes the through hole part 21 and the opening portion 101, blocking the radar body 120 hidden in the automobile body 10. This not only provides a more streamlined exterior for aesthetic purposes but also helps reduce energy consumption during driving due to aerodynamic reasons. Additionally, it protects the radar body 120 from environmental impacts, unauthorized access, and unintended contact pressure, ensuring comprehensive protection. When the automobile activates its autonomous or assisted driving functions, as shown in FIG. 15, the driving source moves the cover plate 30 to the fully open position, and the cover plate 30 is away from the through hole part 21 and is completely accommodated within the fixed housing 20. The cover plate 30 is hidden inside the automobile body 10 to expose the through hole part 21 and the opening portion 101, and an inner cavity of the fixed housing 20 is communicated with the opening portion 101 through the through hole part 21, effectively opening the through hole part 21 on the opening and closing cover assembly and the opening portion 101 on the automobile body 10. Then, the extending mechanism moves the radar body 120 outward to its extended position, as shown in FIG. 21. Once activated, the radar body 120 detects surrounding environment near the opening portion 101, collects environmental data, and transmits the data to an onboard computer. After use, the extending mechanism reversely acts, and drives the radar body 120 to reset, and then the driving source reversely acts, and drives the cover plate 30 to reset through the guide member 70 and the transmission sliding block 80.

Therefore, through the guide member 70 and the transmission sliding block 80, the driving source drives the cover plate 30 to reciprocate between the closed position and the fully open position, allowing the opening portion 101 to be automatically opened and closed, eliminating the need for manual operation and enhancing the user experience. Additionally, as the cover plate 30 opens, it retracts into the automobile body 10. When the cover plate 30 is in the fully open position, it is completely stored inside the automobile body 10, allowing the opening portion 101 to be fully exposed, enhancing the automobile's overall aesthetics. When the cover plate 30 is in the closed position, it covers the through hole part 21 and the opening portion 101, while being visible from the opening portion 101, giving the automobile a streamlined appearance, further enhancing its overall aesthetics.

Further, the installation positions of the opening and closing cover assembly and the radar assembly on the automobile body 10 can be adjusted based on actual needs. When the cover plate 30 moves from the closed position to the fully open position, it may move in various ways. For example, the cover plate 30 may move inward and upward, inward and downward, inward and to the left, or inward and to the right. For ease of description, a preferred embodiment of the present disclosure is described by assuming that the opening and closing cover assembly and the radar assembly are installed on the rear of the automobile body, with the cover plate 30 moving inward and upward from its closed position to its fully open position. Based on this, the fully open position is located above the inner upper side of the closed position, that is, the fully open position and the closed position are relatively disposed up and down, reducing room inside the automobile body 10 that has to be reserved for motions of the cover plate 30.

Figure 6:
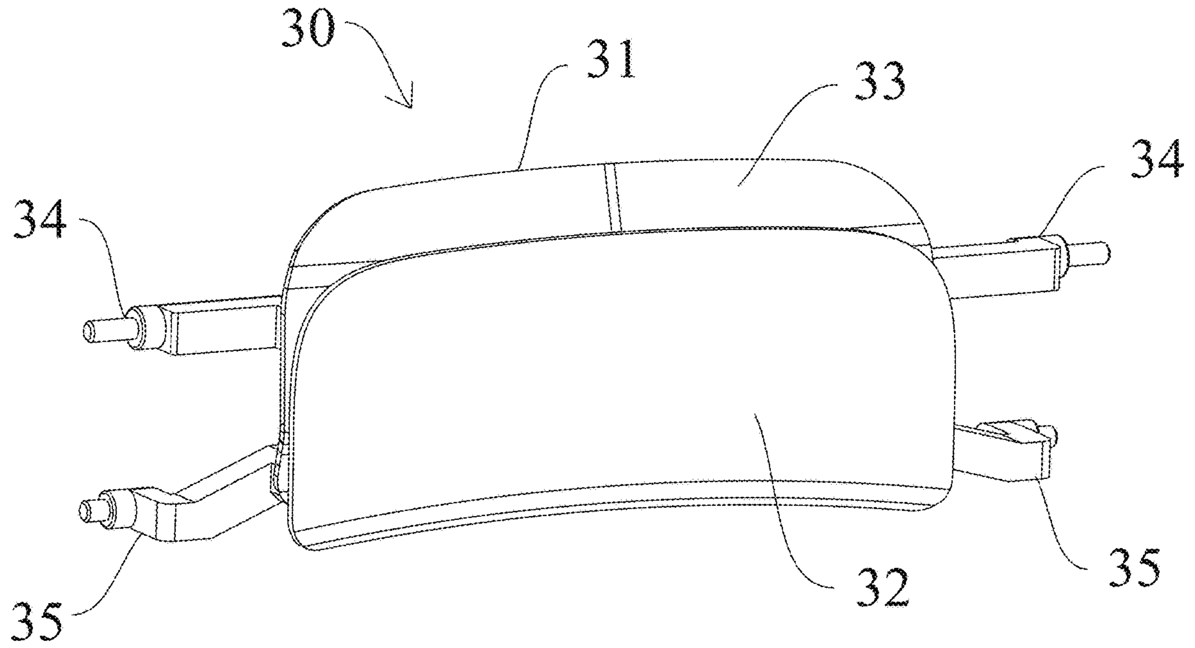
FIG. 6 shows a schematic diagram of the cover plate according to the present disclosure.

As shown in FIG. 6, the cover plate 30 comprises a cover carrier 31 and an outer cover 32 matching the automobile body 10. The outer cover 32 is fixed on an outer surface of the cover carrier 31, and the transmission sliding block 80 is connected to the cover carrier 31. When the cover plate 30 is in the closed position, the cover carrier 31 covers the through hole part 21, and the outer cover 32 is located at the opening portion 101. The outer cover 32 has a paint finish that matches or closely resembles that of the automobile body 10, and its curved surface is also similar to or same as that of regions of the automobile body 10 surrounding the outer cover 32. When the cover plate 30 is in the closed position, there is a nearly seamless transition from the outer surface of the automobile body 10 to the outer cover 32, significantly enhancing the uniformity and overall appearance of the automobile body 10. Preferably, the outer cover 32 is made of metal or composite materials. The cover carrier 31 is thicker and stronger than the outer cover 32, providing sufficient strength to support the sealing and movement functions of the cover plate 30.

As shown in FIG. 12, a sealing ring 40 is fixed to an inner surface of the fixed housing 20, and surrounds the perimeter of the through hole part 21. An inner side of the cover carrier 31 has a circular sealing edge 33. When the cover plate 30 is in the closed position, as shown in FIG. 12, the sealing edge 33 of the cover carrier 31 abuts the sealing ring 40, ensuring dust resistance and water resistance, reducing the likelihood of foreign objects, rain, or dust entering the fixed housing 20, the cover plate 30, or the surrounding automobile body 10. Additionally, the automobile body 10 is sealed by abutting the sealing ring 40 against the sealing edge 33, resulting in a smaller gap between the cover plate (30) and the automobile body 10; this smaller gap reduces air friction when the automobile is in motion, especially at higher speeds, enhancing the automobile's aesthetics. The cover plate 30 fits into the opening portion 101 with such a small gap that it is almost visually undetectable. This minimal gap size ensures that the overall visual appearance of the automobile is either unaffected or only slightly affected, thereby improving the automobile's overall aesthetic appeal. Preferably, when the cover plate 30 is in the fully open position and the radar body 120 is in the extended position, as shown in FIG. 21, an outer side of the radar body 120 abuts the sealing ring 40, providing dust and water resistance. The sealing ring 40 is made of soft materials that can elastically or plastically deform, such as rubbers or foam rubbers.

Figure 5:
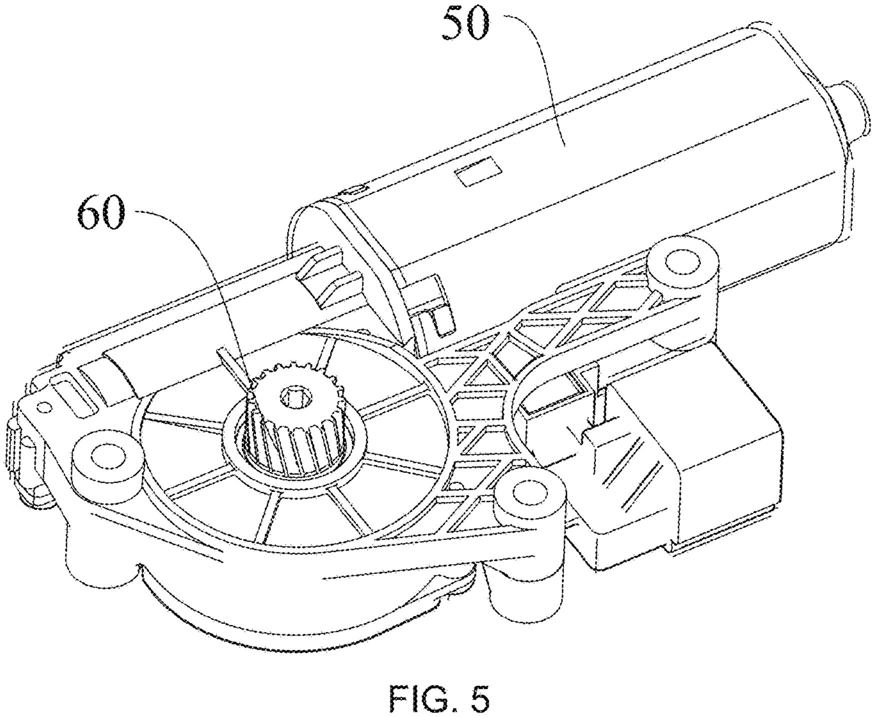
FIG. 5 shows a schematic diagram illustrating connections between the driving source and the gear according to the present disclosure.

Further, as shown in FIGS. 3-5, the opening and closing cover assembly further comprises a gear 60. The driving source 50 is a motor, and the motor drives the gear 60 to rotate through a worm gear and worm mechanism or directly drives the gear 60 to rotate. The guide member 70 is a guide gear rack (i.e., a gear rack for guiding), and an end of the guide member 70 away from the transmission sliding block 80 is engaged with the gear 60. In FIG. 3, when the motor rotates forward, it drives a lower end of the guide member 70 upward through the gear 60, the guide member 70 drives the cover carrier 31 upward through the transmission sliding block 80, moving the cover plate 30 to the fully open position. Conversely, when the motor rotates in reverse, it drives the lower end of the guide member 70 downward through the gear 60, the guide member 70 drives the cover carrier 31 downward through the transmission sliding block 80, moving the cover plate 30 to the closed position.

Figure 11:
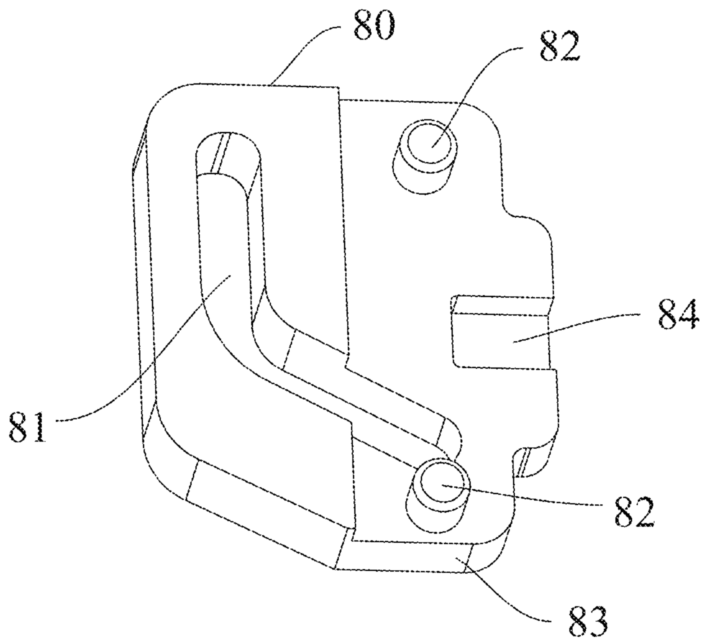
FIG. 11 shows a side view of the transmission sliding block according to the present disclosure, viewed from its outer side.

Preferably, as shown in FIG. 3, the guide member 70 comprises a first straight segment 71, a second straight segment 72, and a bent connecting segment 73. The first straight segment 71 extends straightly along a direction parallel to a line connecting the closed and fully open positions of the cover plate 30, that is, the first straight segment 71 extends along the vertical direction. The second straight segment 72 extends the horizontal direction and is engaged with the gear 60. The bent connecting segment 73 is connected between the first straight segment 71 and the second straight segment 72. A lower end of the first straight segment 71 is fixed to the transmission sliding block 80. As shown in FIGS. 3 and 11, the lower end of the first straight segment 71 is provided with a plug-in block 74, a clamping groove 84 is formed on an outer surface of the transmission sliding block 80, and the plug-in block 74 fits snugly into the clamping groove 84. The first straight segment 71 can slide upward and downward within the first sliding groove 921.

Further, the guide member 70, the transmission sliding block 80, and the fixed guide rail 90 constitute an intermediate transmission unit. The opening and closing cover assembly may comprise one intermediate transmission unit, that is, the guide member 70, the transmission sliding block 80, and the fixed guide rail 90 are arranged only on one side (either left or right) of the cover plate 30. This design is suitable for applications only requiring a lower transmission force. In one embodiment, as shown in FIG. 3, the opening and closing cover assembly comprises two intermediate transmission units arranged symmetrically. In this case, the two second straight segments 72 mesh with an upper side and a lower side of the gear 60, respectively, wherein a line connecting the upper and lower sides is parallel to the radial direction of the gear. A line connecting the two first straight segments 71, a line connecting the two transmission sliding blocks 80, and a line connecting the two fixed guide rails 90, they are all perpendicular to the line connecting the closed and fully open positions of the cover plate 30, that is, the three lines are perpendicular to a movement direction of the cover plate 30. This design is suitable for applications requiring a higher transmission force.

Further, as shown in FIG. 3, the opening and closing cover assembly further comprises a fixed guide member 110 fixed to the automobile body 10, and the fixed guide member 110 and the fixed guide rails 90 are configured to jointly guide the guide members 70. A first guide groove 111 extending in an extending direction of the bent connecting segments 73 and a second guide groove 112 extending in an extending direction of the second straight segments 72 are formed in the fixed guide member 110. Each first sliding groove 921 is communicated with the first guide groove 111, and the first guide groove 111 is communicated with the second guide groove 112. Each bent connecting segment 73 is slidably fitted with the first guide groove 111, and each second straight segment 72 is slidably fitted with the second guide groove 112. That is, the guide gear rack can slide bidirectionally in the first sliding grooves 921, the first guide groove 111, and the second guide groove 112. Preferably, the fixed guide member 110 comprises a body 113 and a cover 114 fixed on the body 113, and both the first guide groove 111 and the second guide groove 112 are formed on a surface of the body 113 and covered by the cover 114. The fixed guide member 110 is assembled for easy processing of the first and second guide grooves. In other embodiments, the fixed guide member 110 may also be designed as an insert-socket set or a plastic-coated hollow iron tube. In addition, the driving source 50 is fixed to the fixed guide member 110, mounting holes 115 are formed in middle positions of the body 113 and the cover 114, respectively, and the gear 60 is accommodated in these mounting holes 115, allowing it to engage with the second straight segments 72 for force transmission.

Figure 8:
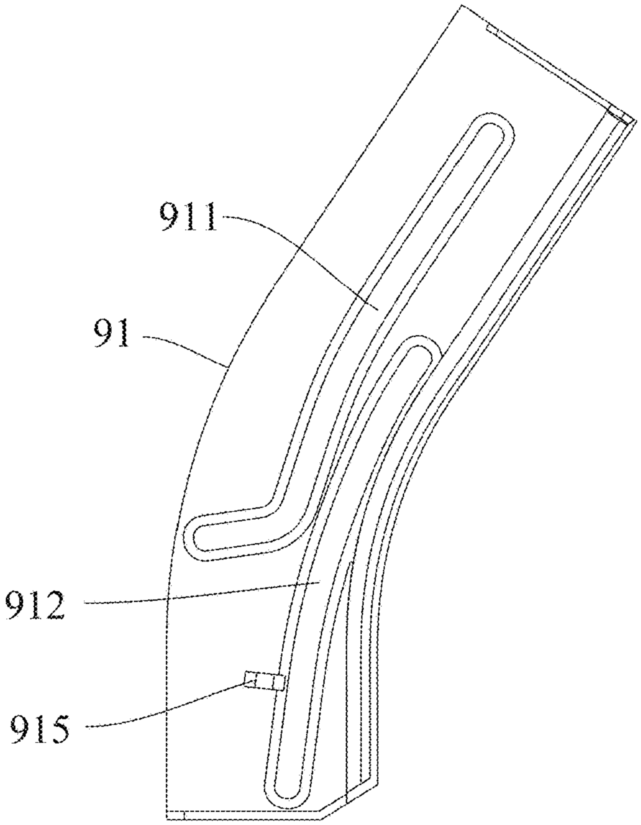
FIG. 8 shows a side view of the inner guide rail according to the present disclosure, viewed from its outer side.

To facilitate the processing of the fixed guide rails 90, it is designed to have a spliced structure with an inner layer and an outer layer. As shown in FIG. 3, each of the two fixed guide rails 90 comprises an inner guide rail 91 disposed on an outer side of the cover plate 30 and an outer guide rail 92 disposed on an outer side of the inner guide rail 91. One of the first straight segments 71 and its corresponding transmission sliding block 80 are both movably disposed between the corresponding inner guide rail 91 and the corresponding outer guide rail 92. The cover carrier 31 is in guide fit with the inner guide rails 91, and each transmission sliding block 80 is in guide fit with its corresponding outer guide rail 92. Therefore, the inner guide rails 91 are designed to guide the sliding of the cover plate 30, while the outer guide rails 92 guide the sliding of the transmission sliding blocks 80 and the guide members 70. Extension curves of each outer guide rail 92 and each inner guide rail 91 are parallel to extension curves of the automobile body 10 near the opening portion 101, ensuring that the cover plate 30 moves roughly parallel to the extension curves of the automobile body 10. Note that, when two curves are said to be parallel, they are "equidistant" or have "constant separation". Preferably, as shown in FIG. 11 (taking one intermediate transmission unit as an example), a lower end of the transmission sliding block 80 is provided with a limiting part 83. As shown in FIG. 8 (taking one intermediate transmission unit as an example), an outer surface of the inner guide rail 91 is provided with a limiting bump 915, and the limiting bump 915 is located on a movement path of the transmission sliding block 80. When the cover plate 30 is in the closed position, the limiting part 83 on the transmission sliding block 80 abuts the limiting bump 915 on the inner guide rail 91, limiting the transmission sliding block 80.

Figure 7:
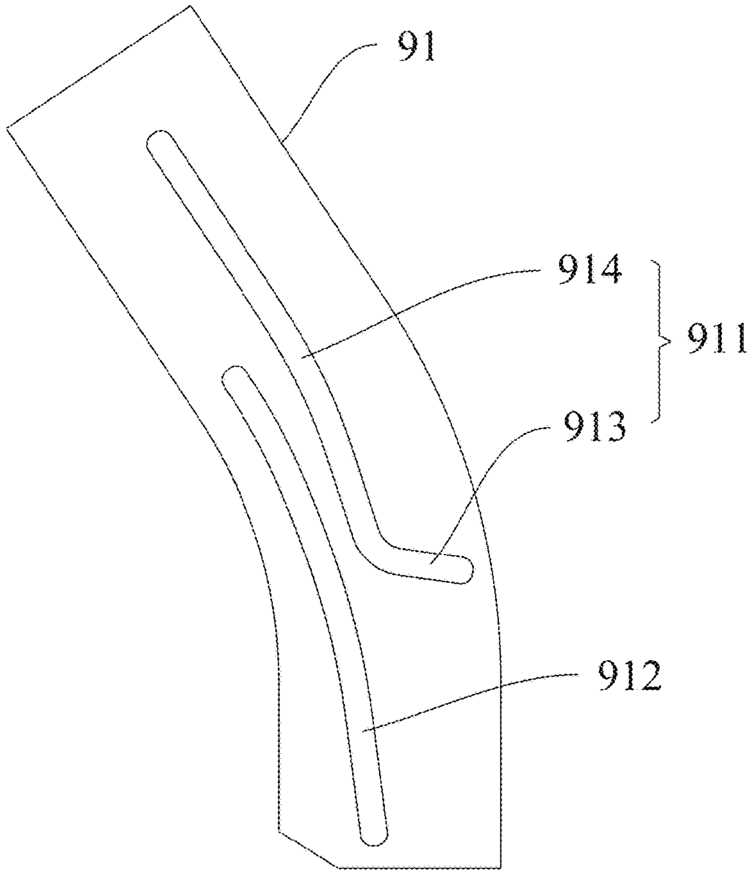
FIG. 7 shows a side view of an inner guide rail according to the present disclosure, viewed from its inner side.
Figure 9:
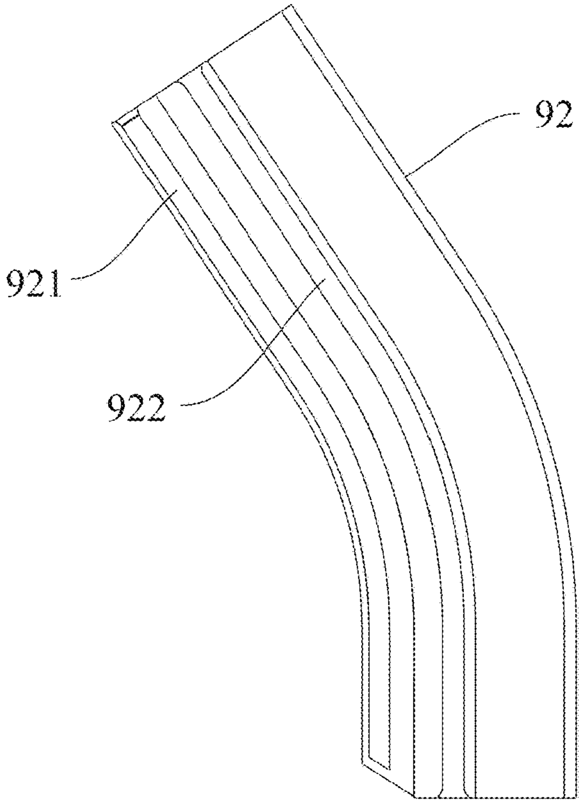
FIG. 9 shows a side view of an outer guide rail according to the present disclosure, viewed from its inner side.
Figure 10:
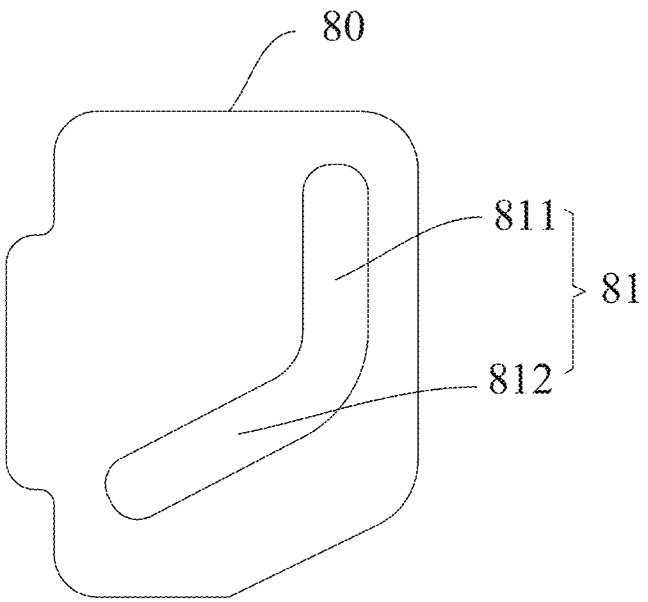
FIG. 10 shows a side view of the transmission sliding block according to the present disclosure, viewed from its inner side.

Further, as shown in FIG. 9 (taking one intermediate transmission unit as an example), the first sliding groove 921 and the second sliding groove 922 are formed in the outer guide rail 92, and the second sliding groove 922 is disposed outside the first sliding groove 921. In other words, the first sliding groove 921 is closer to the cover plate 30 than the second sliding groove 922. The second sliding groove 922 and the first sliding groove 921 are spaced apart from each other. As shown in FIGS. 7 and 8 (taking one intermediate transmission unit as an example), the inner guide rail 91 is provided with a third sliding groove 911 and a fourth sliding groove 912 spaced apart from each other, and the third sliding groove 911 is disposed outside the fourth sliding groove 912. As shown in FIGS. 10 and 11 (taking one intermediate transmission unit as an example), the transmission sliding block 80 is provided with a transmission sliding groove 81, and an outer surface of the transmission sliding block 80 is provided with two guide posts 82, which protrude toward the outer guide rail 92. The two guide posts 82 are relatively disposed up and down, just like the fully open and closed positions. As shown in FIGS. 3 and 6, a line connecting the two active pins 34 and a line connecting the two passive pins 35 are perpendicular to the line connecting the closed and fully open positions of the cover plate 30. The active pins 34 and passive pins 35 protrude toward the inner guide rails 91, and the active pins 34 are disposed above the passive pins 35. During assembly, the guide posts 82 are disposed in and slidably fitted with the second sliding grooves 922. Each active pin 34 is disposed in its corresponding third sliding groove 911 to slidably and rotatably fit with the corresponding third sliding groove 911, during which time the active pin 34 is further disposed in its corresponding transmission sliding groove 81 to slidably and rotatably fit with the corresponding transmission sliding groove 81. Each passive pin 35 is disposed in its corresponding fourth sliding groove 912 to slidably and rotatably fit with the corresponding fourth sliding groove 91. Specifically, as shown in FIGS. 10 and 11, (taking one intermediate transmission unit as an example) the transmission sliding groove 81 comprises a first groove segment 811 and a second groove segment 812 connected to the first groove segment 811, and an obtuse included angle is formed between the first groove segment 811 and the second groove segment 812. As shown in FIGS. 7 and 8 (taking one intermediate transmission unit as an example), the third sliding groove 911 comprises a third groove segment 913 and a fourth groove segment 914 connected to the third groove segment 913, and an obtuse included angle is formed between the third groove segment 913 and the fourth groove segment 914. The corresponding moving processes of the cover plate 30 are as follows (taking one intermediate transmission unit as an example).

Figure 13:
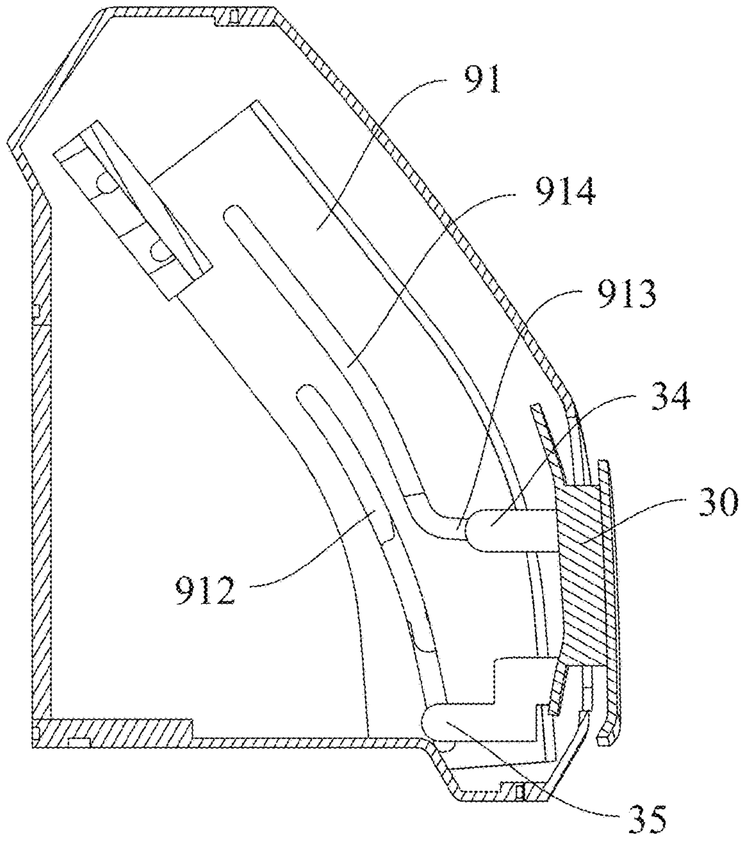
FIG. 13 shows a side view from the inner side of the inner guide rail in FIG. 12.
Figure 14:
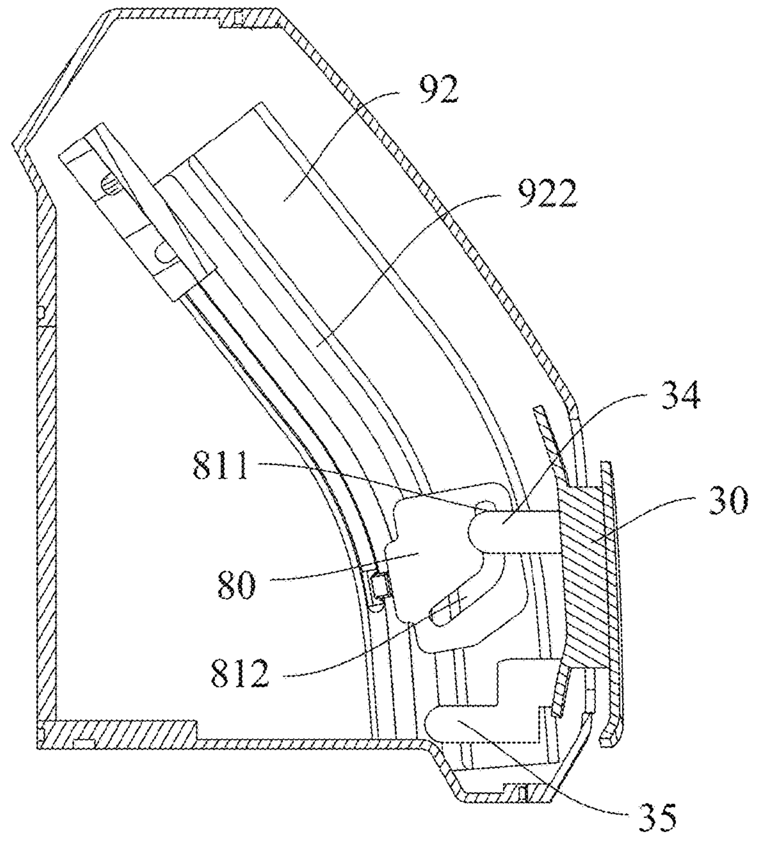
FIG. 14 shows a schematic diagram obtained after omitting the inner guide rail in FIG. 13.
Figure 16:
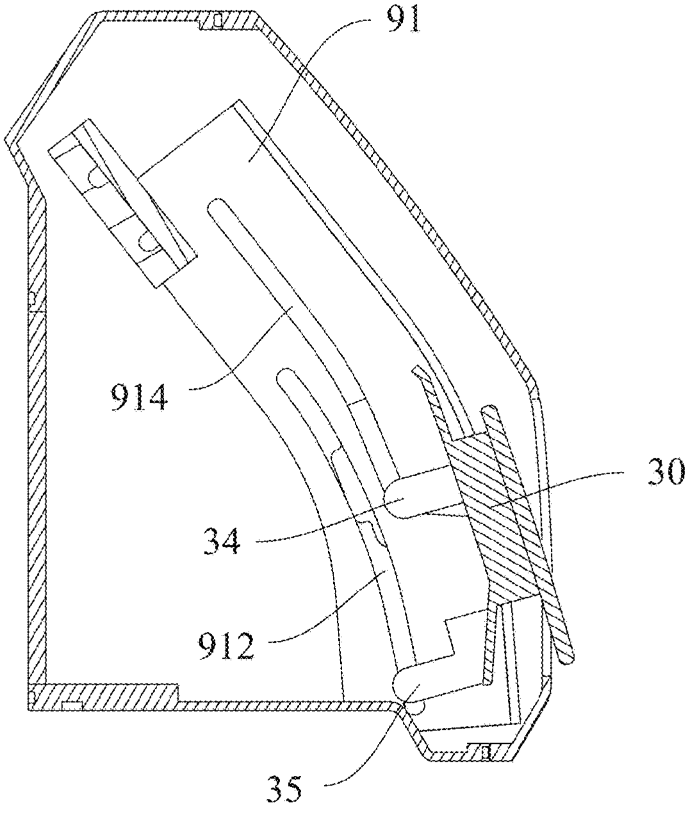
FIG. 16 shows a side view from the inner side of the inner guide rail in FIG. 15.
Figure 17:
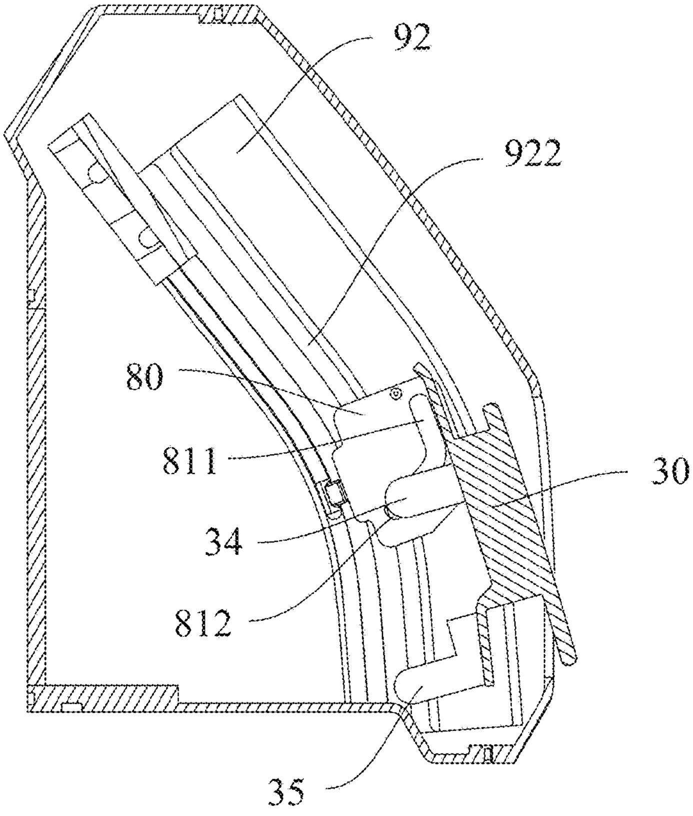
FIG. 17 shows a schematic diagram obtained after omitting the inner guide rail in FIG. 16.
Figure 18:
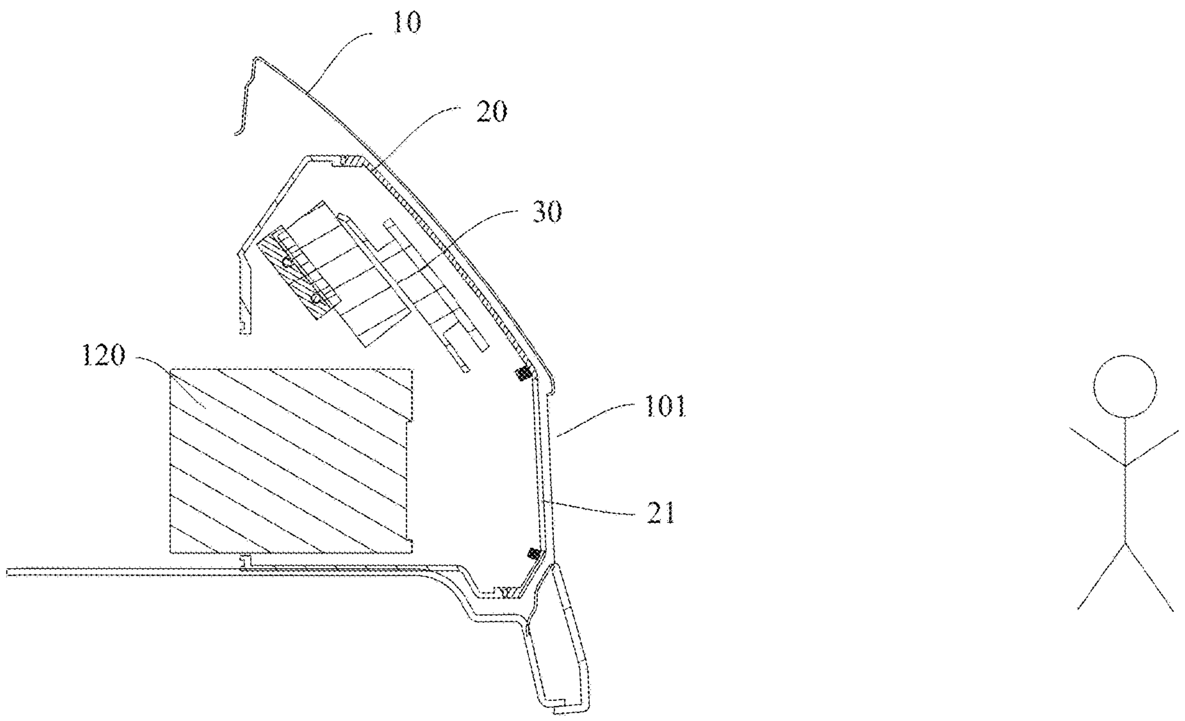
FIG. 18 shows a schematic diagram of the radar assembly when the cover plate is in a fully open position.
Figure 19:
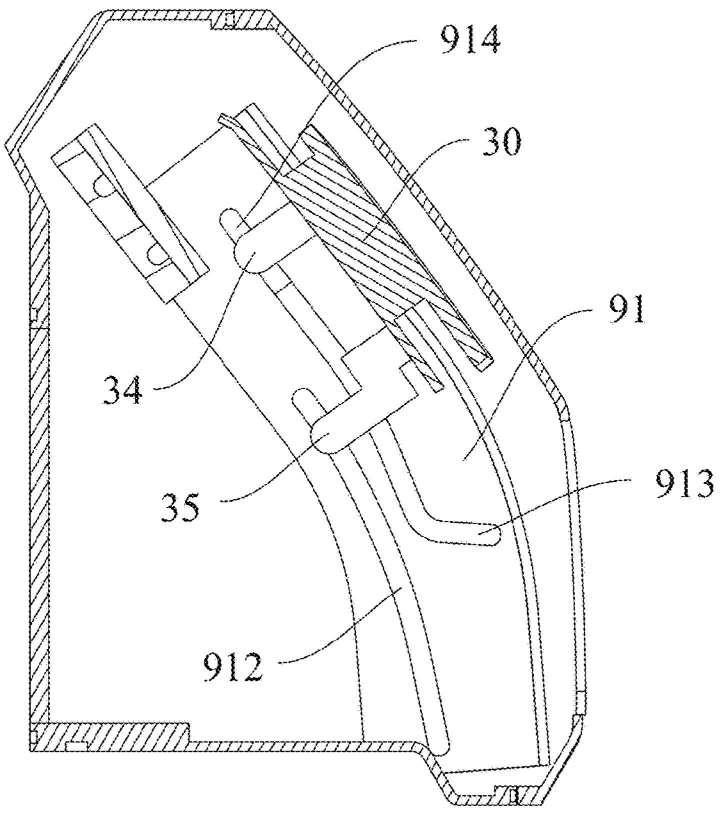
FIG. 19 shows a side view from the inner side of the inner guide rail in FIG. 18.
Figure 20:
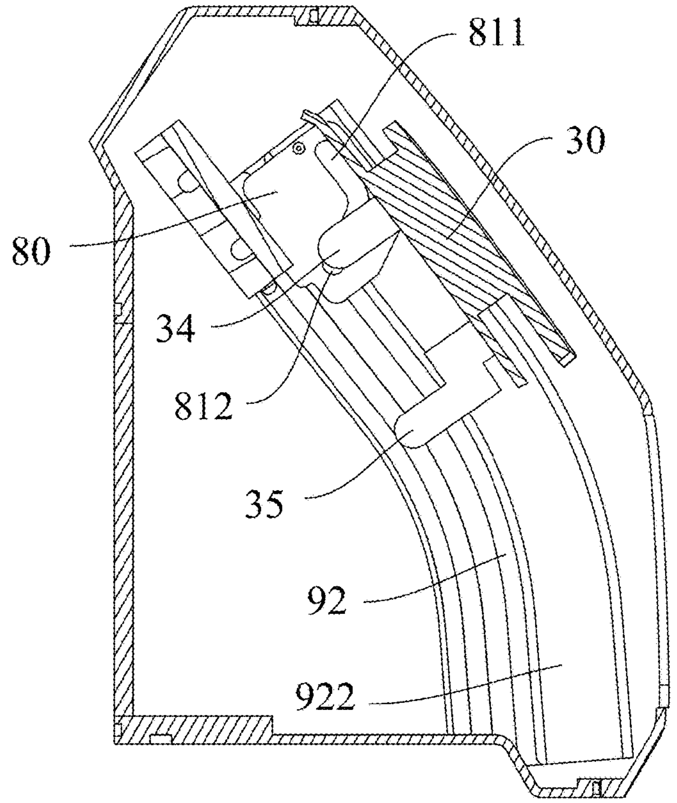
FIG. 20 shows a schematic diagram obtained after omitting the inner guide rail in FIG. 19.

When the cover plate 30 is in the closed position, as shown in FIGS. 12-14, the active pin 34 is located at an upper end of the first groove segment 811 and an outer end of the third groove segment 913, and the passive pin 35 is located at a lower end of the fourth sliding groove 912, or may abut a lower wall of the fourth sliding groove 912. When the transmission sliding block 80 moves up and down along the second sliding groove 922, and the active pin 34 moves in the transmission sliding groove 81, as shown in FIGS. 15-17, the active pin 34 moves and rotates in the third groove segment 913, and the passive pin 35 abuts the fourth sliding groove 912 while rotating, such that the cover plate 30 rotates inward or outward with the passive pin 35 as a fulcrum. When the cover plate 30 is in the fully open position, as shown in FIGS. 18-20, the active pin 34 is located at a lower end (or), inner end of the second groove segment 812 and an upper end of the fourth groove segment 914, and the passive pin 35 is located at an upper end of the fourth sliding groove 912.

Therefore, when the motor rotates forward, it drives the cover plate 30 to move from its closed position to its fully open position as follows: The guide member 70 moves upward in the first sliding groove 921, which in turn drives the transmission sliding block 80 to move upward along the second sliding groove 922. Specifically, the active pin 34 starts sliding along an extension direction of the transmission sliding groove 81 from the upper end of the first groove segment 811, allowing the cover plate 30 to rotate inward with the passive pin 35 as a fulcrum; at the same time, the active pin 34 moves inward in the third groove segment 913. Once the active pin 34 abuts the lower end of the second groove segment 812, as shown in FIGS. 16 and 17, it is also located at an inner end of the third groove segment 913, specifically at a lower end of the fourth groove segment 914. Subsequently, as the transmission sliding block 80 continues to move upward, it drives the cover plate 30 to move upward as well by engaging the active pin 34 with the second groove segment 812, moving the cover plate 30 to the fully open position with an inward-rotated form. That is, the cover plate 30 first rotates inward and then moves upward.

Conversely, when the motor rotates in reverse, it drives the cover plate 30 to move from its fully open position to its closed position as follows: The guide member 70 moves downward in the first sliding groove 921, which in turn drives the transmission sliding block 80 to move downward along the second sliding groove 922. Specifically, the transmission sliding block 80 drives the cover plate 30 to move downward as well by engaging the active pin 34 with the second groove segment 812. When the active pin 34 moves downward to the lower end of the fourth groove segment 914, the transmission sliding block 80 continues to move downward, the active pin 34 slides along the transmission sliding groove 81 from the inner end of the second groove segment 812, during which time the active pin 34 moves outward in the third groove segment 913, allowing the cover plate 30 to rotate outward with the passive pin 35 as a fulcrum, until the limiting part 83 abuts the limiting bump 915; at the same time, the outer cover 32 rotates outward to its closed position, covering both the through hole part 21 and the opening portion 101. That is, the cover plate 30 first moves downward and then rotates outward.

In other embodiments, the cover plate 30 may be driven from one side only; for example, if the left side of the cover plate 30 serves as the driving side and the right side as the passive side, the fixed guide rail 90 on the driving side comprises both the inner guide rail 91 and the outer guide rail 92, while the fixed guide rail 90 on the passive side may contain only the inner guide rail 91 without the outer guide rail 92, and the passive side does not require the guide member 70 and the transmission sliding block 80.

The present disclosure effectively overcomes various shortcomings and a has high industrial value.

The above-mentioned embodiments are merely illustrative of the principle and effects of the present disclosure instead of restricting the scope of the present disclosure. Any person skilled in the art may modify or change the above embodiments without violating the principle of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. An opening and closing cover assembly, mounted at an opening portion (101) on an automobile body (10), wherein the opening and closing cover assembly comprises a cover plate (30) configured for opening and closing the opening portion (101), a driving source (50), a guide member (70) driven by the driving source (50) to perform a reciprocating motion, a transmission sliding block (80), and a fixed guide rail (90) fixed to the automobile body (10); wherein the guide member (70) and the transmission sliding block (80) are fixed to each other, the transmission sliding block (80) is connected to the cover plate (30), a first sliding groove (921) and a second sliding groove (922) are formed within the fixed guide rail (90), the first sliding groove (921) is slidably fitted with the guide member (70), and the second sliding groove (922) is slidably fitted with the transmission sliding block (80); wherein, through the guide member (70) and the transmission sliding block (80), the driving source (50) is configured to drive the cover plate (30) to reciprocate between a closed position and a fully open position;

when the cover plate (30) is in the closed position, the cover plate (30) covers the opening portion (101);

when the cover plate (30) is in the fully open position, the cover plate (30) is inside the automobile body (10), and the opening portion (101) communicates the inside and the outside of the automobile body (10);

wherein an active pin (34) and a passive pin (35) are disposed on an outer peripheral side of the cover plate (30), a third sliding groove (911) slidably fitted with the active pin (34) and a fourth sliding groove (912) slidably fitted with the passive pin (35) are formed within the fixed guide rail (90), and a transmission sliding groove (81) slidably fitted with the active pin (34) is formed within the transmission sliding block (80);

wherein the third sliding groove (911) and the fourth sliding groove (912) are closer to the cover plate (30) than the first sliding groove (921) and the second sliding groove (922), and the transmission sliding block (80) is disposed between the second sliding groove (922) and the third sliding groove (911).

2. The opening and closing cover assembly according to claim 1, wherein the active pin (34) is further rotatably fitted with the third sliding groove (911) and the transmission sliding groove (81), and the passive pin (35) is further rotatably fitted with the fourth sliding groove (912); wherein the transmission sliding groove (81) comprises a first groove segment (811) and a second groove segment (812) connected to the first groove segment (811), and an obtuse included angle is formed between the first groove segment (811) and the second groove segment (812); wherein the third sliding groove (911) comprises a third groove segment (913) and a fourth groove segment (914) connected to the third groove segment (913), and an obtuse included angle is formed between the third groove segment (913) and the fourth groove segment (914);

when the cover plate (30) is in the closed position, the active pin (34) is in the first groove segment (811) and the third groove segment (913), and the passive pin (35) is located at a first end of the fourth sliding groove (912);

when the transmission sliding block (80) moves along the second sliding groove (922) and the active pin (34) moves in the transmission sliding groove (81), the active pin (34) moves and rotates in the third groove segment (913), and the passive pin (35) rotates in the fourth sliding groove (912), such that the cover plate (30) rotates with the passive pin (35) as a fulcrum;

when the cover plate (30) is in the fully open position, the active pin (34) is in the second groove segment (812) and the fourth groove segment (914), and the passive pin (35) is located at a second end of the fourth sliding groove (912).

3. The opening and closing cover assembly according to claim 1, wherein the fixed guide rail (90) comprises an inner guide rail (91) disposed on an outer side of the cover plate (30) and an outer guide rail (92) disposed on an outer side of the inner guide rail (91), the first sliding groove (921) and the second sliding groove (922) are formed within the outer guide rail (92), the third sliding groove (911) and the fourth sliding groove (912) are formed within the inner guide rail (91), and the guide member (70) and the transmission sliding block (80) are movably disposed between the inner guide rail (91) and the outer guide rail (92).

4. The opening and closing cover assembly according to claim 1, wherein two guide posts (82) protrude outward from an end face of the transmission sliding block (80) and are movably disposed in the second sliding slot (922).

5. The opening and closing cover assembly according to claim 1, wherein the transmission sliding block (80) is provided with a limiting part (83), the fixed guide rail (90) is provided with a limiting bump (915), and the limiting bump (915) is located on a movement path of the transmission sliding block (80); wherein when the cover plate (30) is in the closed position, the limiting part (83) on the transmission sliding block (80) abuts the limiting bump (915) on the fixed guide rail (90).

6. The opening and closing cover assembly according to claim 1, wherein the guide member (70), the transmission sliding block (80), and the fixed guide rail (90) constitute an intermediate transmission unit, wherein the opening and closing cover assembly comprises two intermediate transmission units, wherein a line connecting the two intermediate transmission units is perpendicular to a line connecting the closed position and the fully open position of the cover plate (30).

7. The opening and closing cover assembly according to claim 1, further comprising a gear (60), wherein the driving source (50) is a motor, the guide member (70) is a guide gear rack, the driving source (50) is connected to the gear (60) for driving the gear (60) to rotate, and an end of the guide member (70) away from the transmission sliding block (80) is engaged with the gear (60).

8. The opening and closing cover assembly according to claim 7, wherein the guide member (70) comprises a first straight segment (71), a second straight segment (72), and a bent connecting segment (73); wherein the first straight segment (71) extends straightly along a direction parallel to a line connecting the closed and fully open positions of the cover plate (30), the second straight segment (72) is engaged with the gear (60), and the bent connecting segment (73) is connected between the first straight segment (71) and the second straight segment (72); wherein an end of the first straight segment (71) is fixed to the transmission sliding block (80), and the first straight segment (71) is located in the first sliding groove (921).

9. The opening and closing cover assembly according to claim 8, further comprising a fixed guide member (110) fixed to the automobile body (10), wherein a first guide groove (111) extending in an extending direction of the bent connecting segment (73) and a second guide groove (112) extending in an extending direction of the second straight segment (72) are formed in the fixed guide member (110), wherein the first sliding groove (921) is communicated with the first guide groove (111), and the first guide groove (111) is communicated with the second guide groove (112), wherein the bent connecting segment (73) is slidably fitted with the first guide groove (111), and the second straight segment (72) is slidably fitted with the second guide groove (112).

10. The opening and closing cover assembly according to claim 1, wherein the cover plate (30) comprises a cover carrier (31) and an outer cover (32) matching the automobile body (10), wherein the outer cover (32) is fixed on an outer surface of the cover carrier (31), and the transmission sliding block (80) is connected to the cover carrier (31); wherein when the cover plate (30) is in the closed position, the outer cover (32) is located at the opening portion (101).

* * * * *